(12) United States Patent
Murphy

(10) Patent No.: US 9,575,807 B2
(45) Date of Patent: Feb. 21, 2017

(54) PROCESSING ACCELERATOR WITH QUEUE THREADS AND METHODS THEREFOR

(71) Applicant: Intel Corporation, Santa Clara, CA (US)

(72) Inventor: Nicholas J. Murphy, The Sands (GB)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/253,279

(22) Filed: Apr. 15, 2014

(65) Prior Publication Data

US 2015/0293785 A1   Oct. 15, 2015

(51) Int. Cl.
*G06F 9/46*     (2006.01)
*G06F 9/50*     (2006.01)

(52) U.S. Cl.
CPC ..... *G06F 9/5027* (2013.01); *G06F 2209/5018* (2013.01)

(58) Field of Classification Search
CPC ....................................................... G06F 9/5038
USPC .......................................................... 718/102
See application file for complete search history.

(56) References Cited

U.S. PATENT DOCUMENTS

| | | | |
|---|---|---|---|
| 2010/0070730 A1* | 3/2010 | Pop | G06F 8/4442 711/167 |
| 2012/0216012 A1* | 8/2012 | Vorbach | G06F 8/443 712/11 |

* cited by examiner

*Primary Examiner* — Timothy A Mudrick
(74) *Attorney, Agent, or Firm* — Green, Howard & Mughal, LLP

(57) ABSTRACT

Techniques related to a processing accelerator with queue threads are described herein.

5 Claims, 10 Drawing Sheets

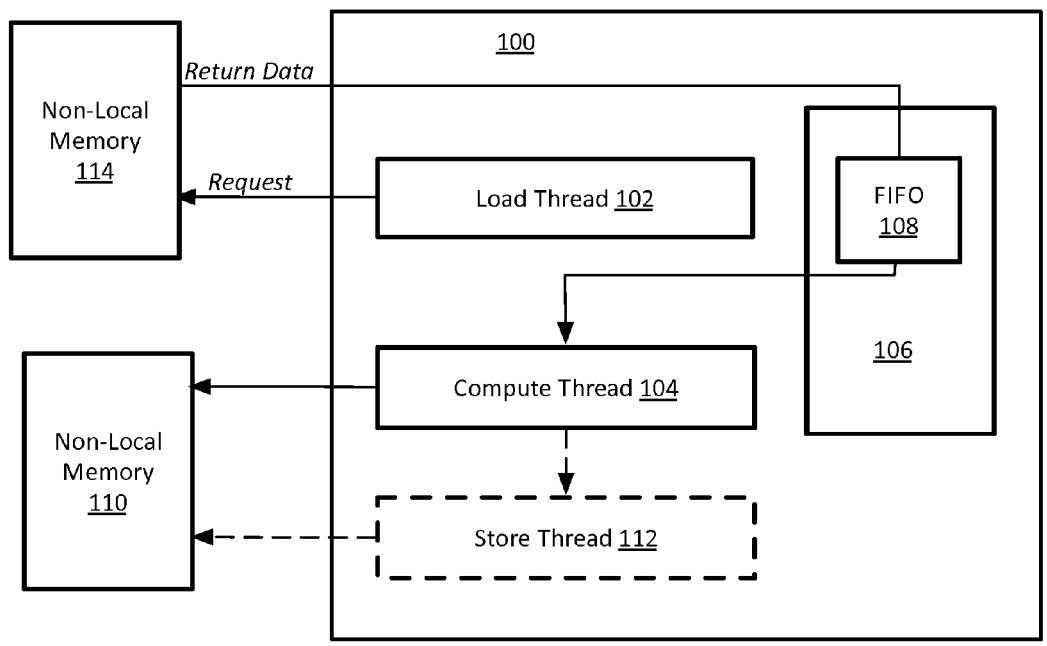

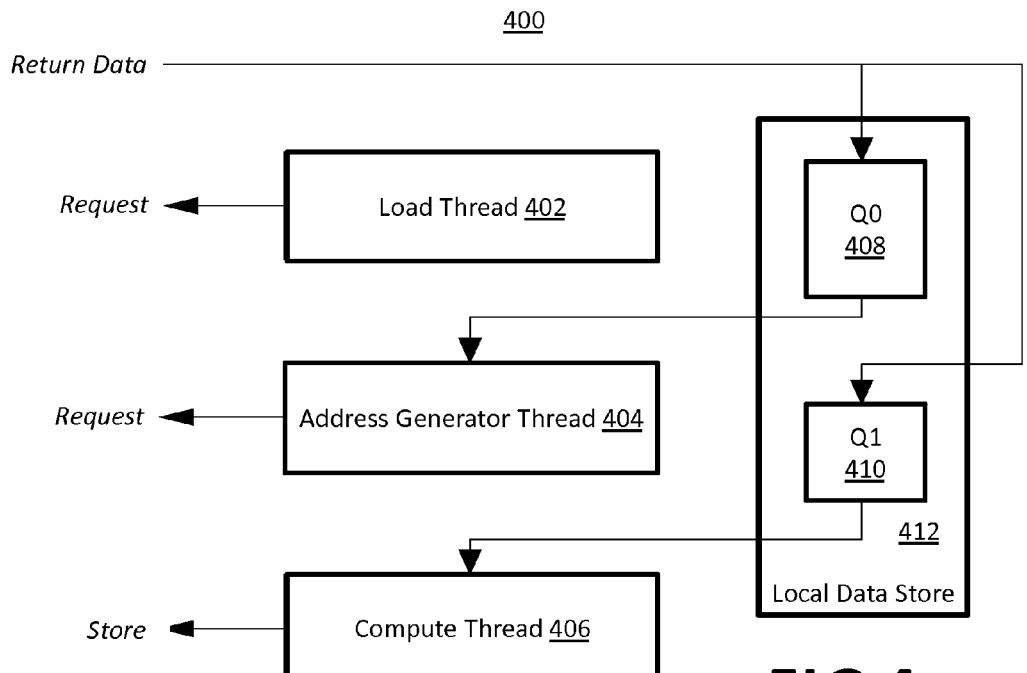
FIG 4
FIG 5
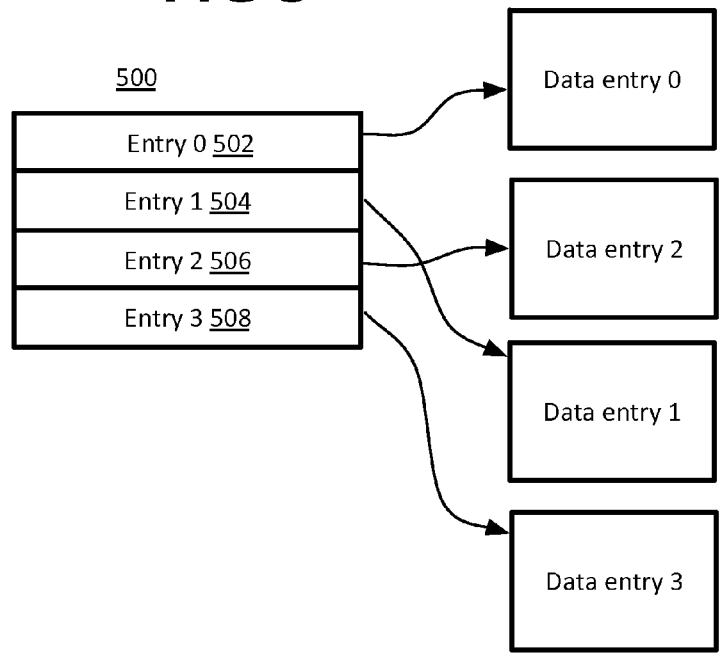

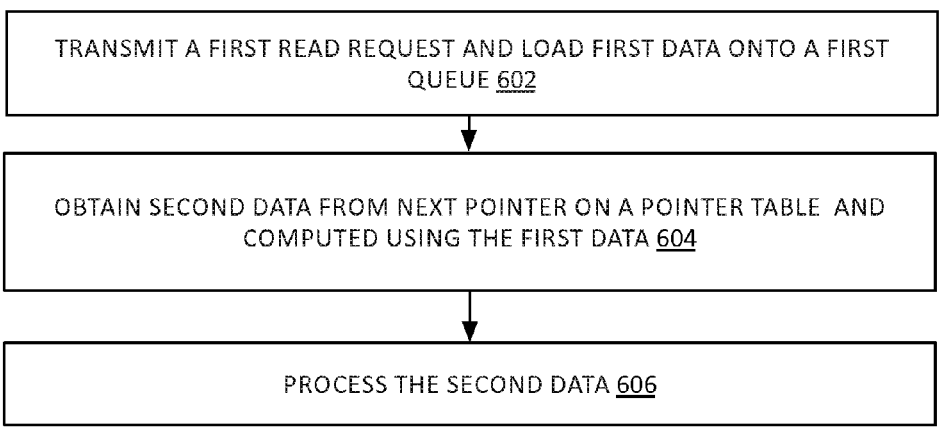
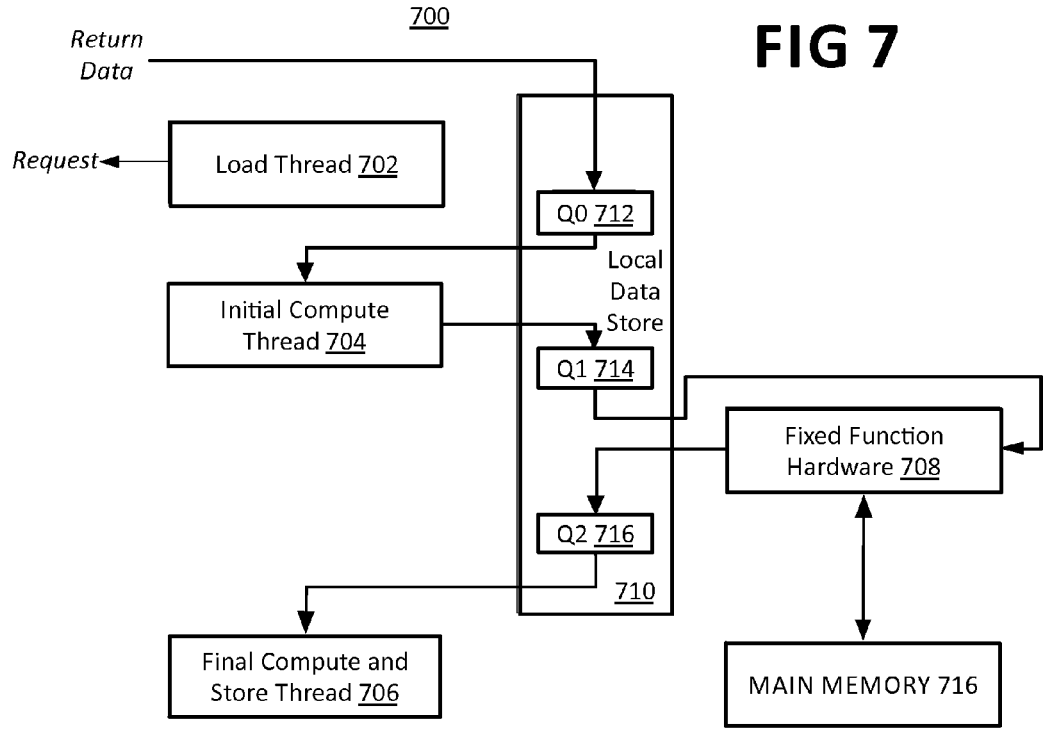

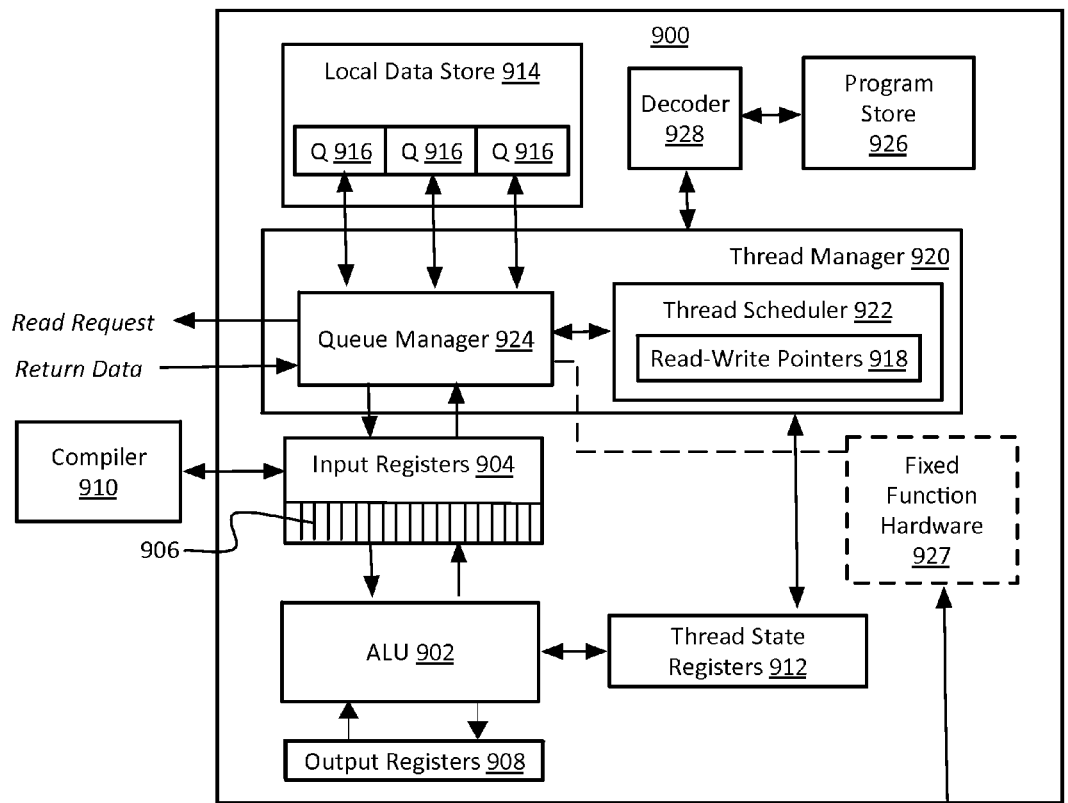
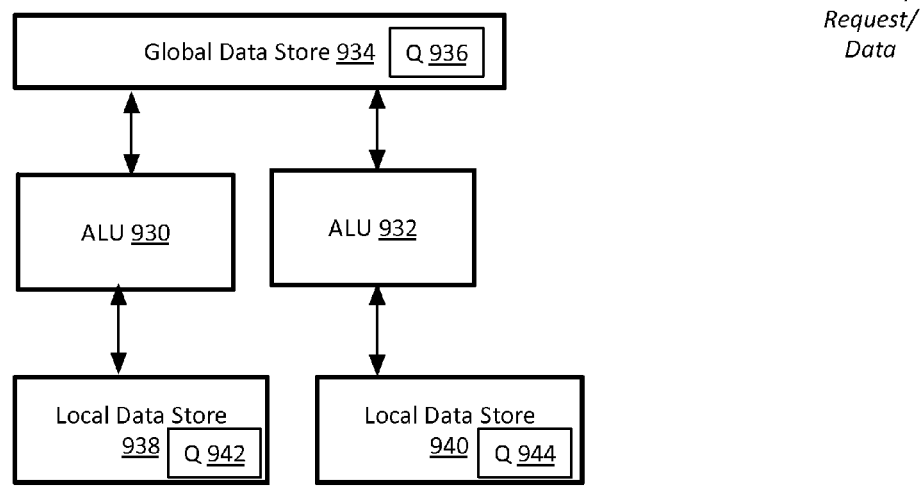

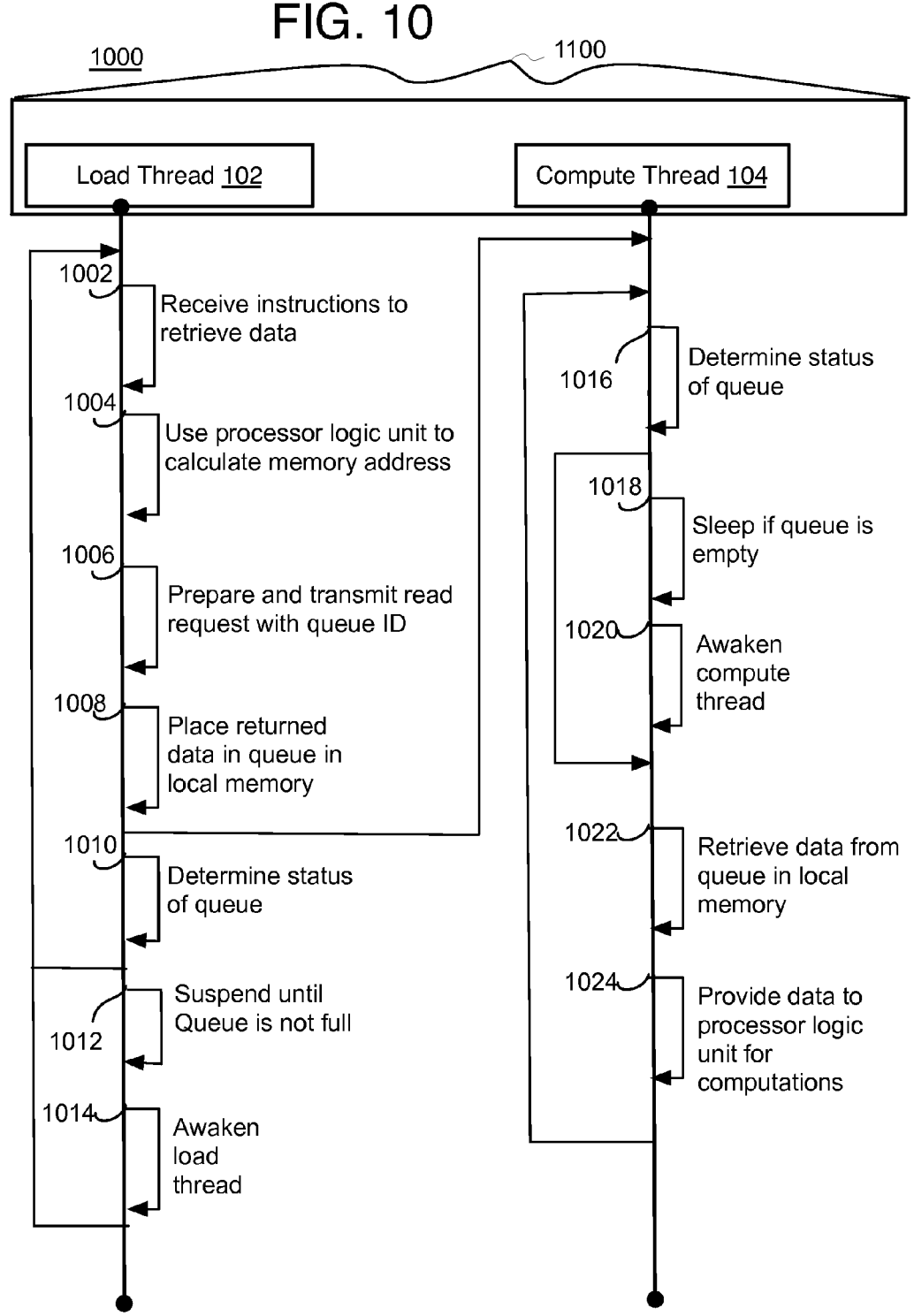

PROCESSING ACCELERATOR WITH QUEUE THREADS AND METHODS THEREFOR

BACKGROUND

Images displayed on a computer or electronic device are often provided by use of an image processing accelerator that handles the extremely large computational load typically needed to provide 2D and 3D images in an efficient manner. This may include memory-intensive texture mapping, rendering of polygons, transformation of vertices into different coordinate systems, programmable shader support, and so forth, and as well as video decoding processes such as motion compensation, inverse discrete cosine transform, and so on. Thus, these accelerators may handle millions of vertices or pixels in a frame. The accelerator may have a graphics processing unit (GPU) for example to perform the calculations. These systems, however, may still have a relatively high latency where latency is the time from when a processor requests data from a memory until the data is received by the processor. During this latency, processor components may sit idle while waiting for data. Thus, without compensating for the latency, delays may occur while both the processor and memory bandwidth may be under-used such that it affects the performance of the device.

In order to reduce or hide the latency, the GPUs may use many (tens to hundreds) of parallel threads performing the same tasks to handle the high number of calculations so that computations for many pixels can be performed simultaneously. A thread is a sequence of instructions that is executed independently of other sequences. For example, this may include a processor that supports multi-threading time-slice of the execution of different threads on the same hardware. With this arrangement, when one thread is stalled due to a memory load, it may suspend operation, and a context switch may be triggered to have the processor work on another thread while waiting for the data for the first thread. This may hide the latency from a programmer since the arithmetic logic unit (ALU) may have less down time. Such a system, however, is often arranged with hardware to store thread states and includes registers assigned to each thread. Thus, where a GPU needs to have many ALUs each with many threads to hide latency, such a configuration may consume too much power or may be cost prohibitive to be used in smaller devices such as smartphones or tablets.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 1 is an illustrative diagram of an image processing accelerator;

FIG. 2 is a flow chart showing an example process for an image processing accelerator;

FIG. 4 is an illustrative diagram of another image processing accelerator;

FIG. 5 is a schematic of a table of pointers and data entry order;

FIG. 6 is a flow chart showing an example process performed by the image processing accelerator of FIG. 4;

FIG. 7 is an illustrative diagram of another image processing accelerator;

FIG. 9 is an illustrative diagram of an image processing accelerator;

FIG. 9A is an illustrative diagram of a portion of another image processing accelerator;

FIG. 10 is an illustrative diagram of an example image processing accelerator in operation for processing data;

DETAILED DESCRIPTION

Figure 3:
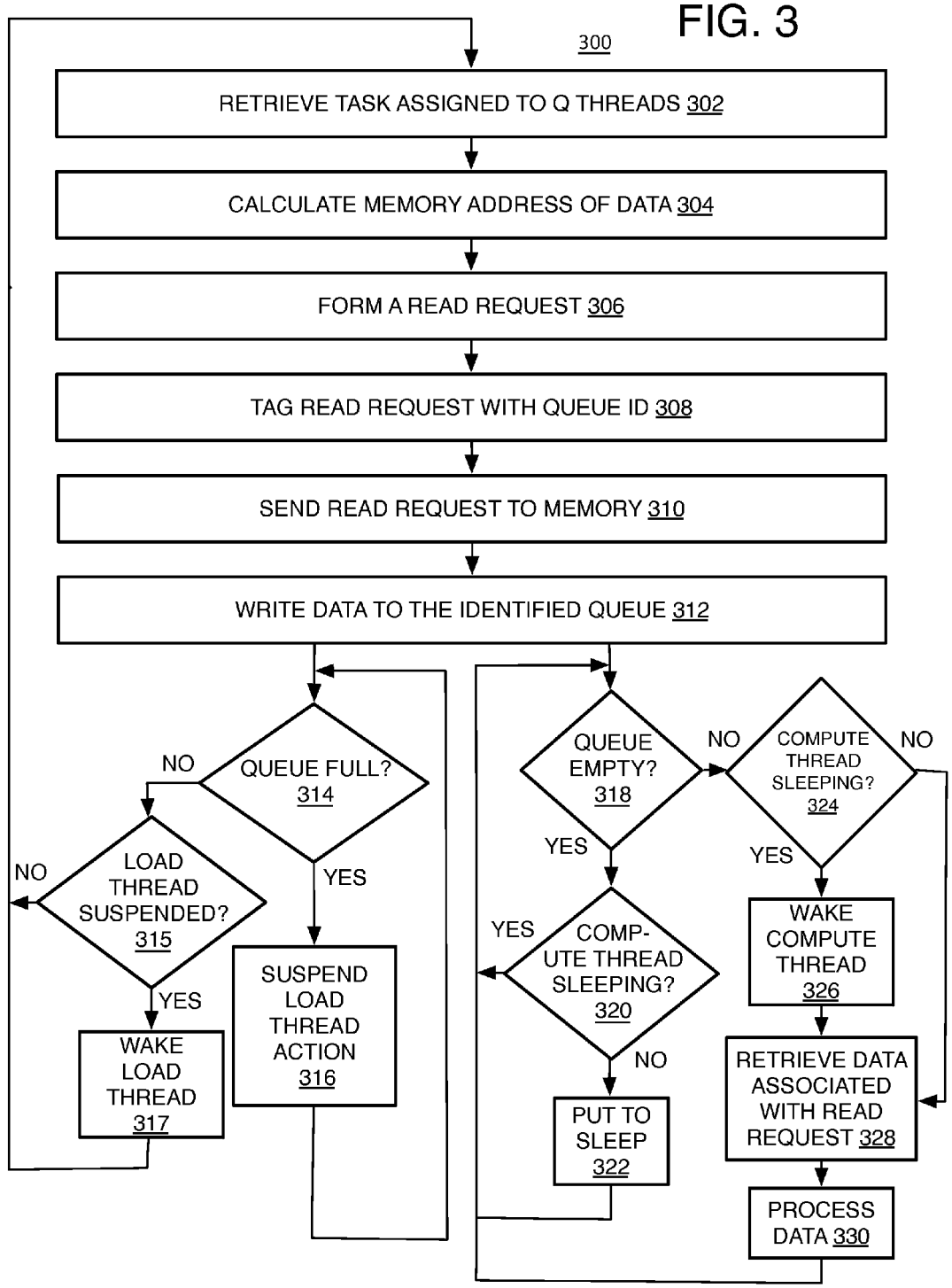
FIG. 3 is another flow chart showing an example process for an image processing accelerator.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware alone or in combinations with firmware and software. The material disclosed herein may also be partially implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

A processing accelerator with queue threads and systems, apparatus, and methods related thereto are described below.

As mentioned above, it is desirable to develop a processor that can perform computations for an enormous amount of image data without consuming relatively large amounts of power at high cost as with typical GPU multithreading configurations, and while reducing latency to increase the efficiency and speed of the processor. As alluded to above, memory latency, herein, may be the time between a processor making a request for data and receiving it, while memory bandwidth may be the amount of data that can be transferred between memory and processor per unit time.

Typically, there are three standard solutions to latency. First, a cache may be used to pre-fetch data local to a recently requested address. Cache, however, may not be particularly efficient with image data since such a large amount of image data may require an enormous cache, and obtaining image data causes many misses since requested data from a frame of pixel data for example may be much more like random access data across a frame rather than locality-related data.

By one specific example, most processors have a data cache that will request more data from memory than the processor has requested, on the assumption that most programs show good data locality and are likely to use data close to previously accessed addresses. This approach usually works quite well, but a processing loop working through a data array will suffer the full cache-miss latency every time it crosses a cache line boundary because each location is visited only once so the data will not be resident in the cache.

The cost of the cache miss can be reduced by unrolling the processing loop and moving the load request earlier in the instruction stream. If the processing is simple, the loop may have to be unrolled many times before it can cover the load latency. Software pipelining like this is often used because it is seen as free. Loop unrolling, however, needs more local registers to store the calculations in flight, and the software complexity is much higher. Loop unrolling is common in compilers, but they may need help in complex algorithms, particularly those with conditional or dependent loads.

Second, to avoid the cache difficulties, a GPU may use multithreading. GPUs suffer worse latency than central processing units (CPUs) because they typically have additional processing such as filtering in the data load path so that most GPUs use hardware threading. Each thread processes one item, and when it stalls due to a memory load, the thread suspends and another thread is activated. Specifically, in known multithreading processors, data that is to be loaded from memory and processed is handled by a single thread executing a loop that performs the steps (1) load, (2) process, (3) store, and then keeps repeating the loop with (1) load again, and so. Thus, there is a stall equal to the latency of a load from memory before each processing step. If the processing is simple, this stall has a significant impact on performance.

If enough threads are supported (and GPUs may handle hundreds of threads), memory latency can be completely hidden from the programmer. The price paid for this convenience is hardware to store each thread's state, including a full set of registers with a certain number of registers assigned to each thread where there may be hundreds of threads. This approach works well for GPUs on systems that can handle the power load. Thus, generally, such a system is flexible due to so many threads but relatively power hungry and expensive. As mentioned above with cache, while it also is possible to reduce the stall by unrolling the thread loop to load data earlier, this rapidly increases software complexity, and therefore development time, with each unrolling.

Third, some specialized processors hide latency with a direct memory access (DMA) engine that fetches data into local RAM for the processor, as instructed, so that the processor can perform other tasks while the DMA is fetching the desired data. This is in contrast to the cache that estimates which data will be needed next. This is very cost effective for algorithms that fit the limitations of DMA controllers (typically linear or two-dimensional data buffers) but it does not work well for algorithms with irregular access patterns or dependent loads. If the DMA controller is fully programmable, it can handle difficult addressing patterns, but there may need to be several of them for algorithms that require access to multiple buffers. Thus, generally, a DMA is relatively inflexible since it needs particular addresses or access patterns (where it needs a start point memory location and obtains data from that point forward for example). These access patterns are often fixed when hardware is designed, not when software is deployed.

To overcome the disadvantages described above, an image processing accelerator (or imaging accelerator or processor) herein forms a processing architecture that can compensate for high latency memory accesses without significant increase in gate count (for example, without adding a significant number of gates or in turn transistors, to a processor). The imaging accelerator may fall under the direction of a GPU or CPU, but the principles described herein may be applied to a broad set of designs and use cases. The image processing accelerator may be looked upon as a compromise between the flexible multithreading system and the inflexible DMA system. As mentioned, threading is usually expensive but flexible, while DMA is usually inexpensive but restrictive, Thus, the compromise that is the image processing accelerator using queue threads described herein provides a relatively inexpensive and flexible method of hiding the latency of data loads made by a programmable image processing accelerator.

Also, it is inexpensive to add more processing as silicon geometry shrinks, but this almost always increases memory latency by adding more stages of cache or arbitration. Instead, the queue threads are a lightweight enhancement to processor design that addresses the growing imbalance between raw processing performance and the ability of the memory system to keep the processor busy.

Referring to FIG. 1, the reduction of latency can be achieved by providing an image processing accelerator that has an ALU or other processing unit, and uses two threads where one thread is maintained to determine data memory address locations or obtain data or both, and the other thread is maintained to process the data at least partially asynchronously to the obtaining of the data in order to reduce latency. This arrangement may use only a few threads, such as up to eight threads, instead of the tens to hundreds of threads used in a multi-threading GPU system. Thus, the present accelerator uses less hardware and power to operate even though it may be less flexible than the known GPU multithreading system. The present arrangement may be used in addition to such a GPU multithread system, and is not necessarily a complete replacement for GPU multithreads. Providing such a reduction in cost and power provides another alternative configuration for accelerators or processors, making such accelerators or processors relevant to new market segments such as phones and tablets.

It should also be noted that while an ALU is mainly described herein, another type of processor logic unit, such as a floating point unit (FPU) could be used as well where applicable, and instead of, or in addition to the ALUs. Thus, processor logic unit herein means the component of the processor that executes computer code.

A processing accelerator 100 may have at least one load thread (or address thread, or memory address thread) 102 that computes memory addresses. A processing accelerator may have, or may be, a processor as explained below, and is not necessarily limited to the processing of multimedia data (images, video, audio, and so forth). To derive the memory addresses, the load thread may include placing data necessary to determine a memory address at input registers of an arithmetic logic unit (ALU) to perform computations and calculate the memory address. The input registers may be assigned to the load thread as explained below. The load thread also then transmits a read request to request the data from at least one memory 114 such as a main memory or other non-local memory component that is external to the processing accelerator 100. The data is returned to at least one local memory (or local data store) 106 such as a random-access memory (RAM) where the data is accessible for use or processing. By one form, the local memory 106 has a queue 108, which in one case may be a first-in, first-out (FIFO) queue, for storing the retrieved data. At least one compute thread (or process or processing thread) 104 retrieves the data from the local memory or queue 108 and processes the data. By one example, this may include placing the data from the queue 108 into input registers of the ALU assigned to the compute thread for use in computations. The results of the computations may then be stored in at least one non-local memory 110 or used for further computations. The non-local memory 110 and 114 may or may not be the same memory. The accelerator 100 may run at least two, but in some form multiple threads such as eight to ten threads, where at least one thread 102 loads data and at least one thread 104 execute computations on the loaded data, but where many different combinations are possible. The load thread 102 runs ahead of the compute thread 104 to attempt to ensure data is ready for processing. The two threads 102 and 104 effectively communicate through the queue 108. The load or compute threads 102 and 104 may be referred to as queue (Q) threads, and as explained below, the Q threads may time-slice on the same hardware.

A store thread 112 is shown in dashed line. There is usually no need for a separate store thread, but in some situations it may be useful to have at least one store thread. A store thread can combine the outputs of multiple compute passes into a single write, making it an intelligent write combiner and removing more hardware. In the same way, the load thread may request more data than a single compute pass needs, and another receiving thread can break up the returned data, apply any formatting needed, and write it to the compute thread's input queue.

It will be appreciated that while the load and compute threads may be considered to use only components that are entirely within the processing accelerator 100, this is not always the case, and the load thread and compute thread may include or use components that are not considered internal to the processing accelerator as long as the threads are providing data to a processor logic unit as explained below.

Referring to FIG. 2, a process 200 is provided to show how the latency may be reduced or eliminated. Example process 200 is arranged in accordance with at least some implementations of the present disclosure. In general, process 200 may provide a computer-implemented method of image processing acceleration. In the illustrated implementation, process 200 may include one or more operations, functions or actions as illustrated by one or more of operations 202 and 204. By way of non-limiting example, process 200 will be described herein with reference to operations discussed with respect to example processing accelerator 100 or any of the other example accelerators, processors, or systems described herein.

By one example, process 200 may include "reserve at least one load thread to perform tasks related to locating or obtaining data or both from at least one memory" 202. Particularly, instead of, or in addition to, using threads that perform all of the same tasks, here a load thread may be reserved for computing memory addresses and sending read requests for the data. By one approach, the load thread only performs tasks related to locating or obtaining memory from data, and does not perform computations with the data that are unrelated to those tasks. For the instant example, it may be assumed that the load thread is finding data for one convolution, and here that may be a block of data for 3×3 pixels (or nine pixels) that is a portion of a frame of pixel data. The process 200 may then also include "reserve at least one compute thread to perform calculations using data associated with a load thread and performed by at least one processor logic unit" 204. Thus, by one form, the compute thread only performs tasks related to such computations such as obtaining the data from a local queue and placing the data in the input of the processor logic unit for processing (calculations). The compute thread, by this approach, does not perform any tasks related to obtaining the data from non-local memory. While the compute thread is busy with calculations using data obtained from previous requests for data, the load thread may be requesting data for further processing tasks. Thus, the compute thread may operate at least partially asynchronously to the operation of the load thread. Specifically, once the compute thread obtains data found by the load thread, the load thread can load further data while the compute thread is processing the previously found data as explained in greater detail below. At a minimum, the priority of the load thread is to obtain data from non-local memory, and the priority of the compute thread is to process data from local memory. Thus, by another view, it can be said that the load thread mainly, or substantially, or mostly performs tasks related to locating or obtaining data or both, while the compute thread mainly, or substantially, or mostly performs tasks related to processing the data (using the data in calculations) that are unrelated to the task of obtaining of the data from non-local memory. More specifically, the data requested by the load thread is placed in a queue in local memory, and the compute thread works on the data whenever it is present in the queue. In one example, each thread exits on completion, but an additional outer loop could check for another convolution of a frame to execute. More details are explained below.

It will also be appreciated that a data access pattern in the load thread may not be the most efficient if the load thread performs separate read requests for each of the nine source pixels mentioned. A more efficient implementation would be to re-use six pixels while moving along a scan line. It might be still more efficient to compute vertical strips (reducing page breaks) but that depends on the details of the memory architecture and does not change the principles shown here. Thus, many examples are contemplated for the form and content of the read request and are not necessarily limited by the present processing accelerator except perhaps by the size of the queue used to store the returned data.

Referring to FIG. 3, a more detailed computer-implemented process 300 for image or other processing acceleration is explained. Example process 300 is arranged in accordance with at least some implementations of the present disclosure. In the illustrated implementation, process 300 may include one or more operations, functions or actions as illustrated by one or more of operations 302 to 330 numbered evenly. By way of non-limiting example, process 300 will be described herein with reference to operations discussed with respect to example accelerator 100 or any of the other example accelerators or systems described herein.

Process 300 may include "retrieve task assigned to Q threads" 302, and by the load thread. This may include assigning a certain part of a frame of pixels to the load thread to be worked on. The process 300 may then include "calculate memory address of data" 304 to determine where the desired data is stored. This may include placing initial data in input registers of the ALU and assigned to the load thread, and then performing calculations by the ALU to compute a memory address, such that the load thread and the compute thread take turns using the ALU. Once the memory address is determined, the process 300 may "form a read request" 306 to retrieve the desired data, and continue with "tag read request with queue ID" 308 so that the read request is tagged with an ID of the queue the data will be written to upon return. This is performed so that the processor knows which queue to place the data in when the local memory, or memories, has more than one queue. The read request is sent 310, and in one form, to a memory, or more specifically a memory manager of a non-local memory, and the process 300 writes the data to the identified queue 312. The queue is then monitored to indicate when the queue is full 314. This may be accomplished by determining the position of pointers along the queue as explained later below. Otherwise, when the load thread has issued enough requests to fill the queue with a known capacity, it suspends. In this case, the thread manager or queue manager may simply count the number of requests issued by the load thread and the number of data entries pulled out of the queue by the compute thread. By one form, the requests issued are counted rather than the data returned so that there is guaranteed space in the queue for all data returned. Thus, if the queue is full, the processor will "suspend load thread action" 316, and the ALU resources are used elsewhere. The load thread may remain suspended until a queue has an open slot.

By one example, the load thread may be sending data requests for multiple queues, and in this case, will not be suspended until all of the queues are full. In another case with multiple queues, certain tasks may be assigned to certain queues, and the load thread may be, or may be considered to be, suspended for certain queues that are full while operating for other queues. In other cases, there may be multiple queues with multiple load threads where one load thread may be assigned to each queue which will suspend when their assigned queue is full. Otherwise, there may be multiple queues assigned to each one of multiple load threads.

If the queue is not full, it is determined whether the load thread is suspended 315. If not, the load thread loops to start the process again to send a read request for more data. If so, the load thread is first wakened 317, and the process restarts or loops to send a read request for more data. As mentioned above, the load thread may proceed in a loop block-by-block of pixel data for example on an image or frame of pixel data.

As to the operation of the compute thread, the process 300 also includes monitoring whether the queue is empty 318. As with monitoring whether the queue is full, a queue manager or thread manager may simply count data entries exiting the queue. If the queue is empty, the process may check 320 to determine if the compute thread is asleep. If so, the processor continues with monitoring the queue. If not, the process 300 includes "put compute thread to sleep" 322. In the sleep mode, the ALU resources are used elsewhere such as by the load thread to compute addresses, or the system is idle until instructions are received to perform a task. When the queue is not empty, the process 300 includes determining whether the compute thread is asleep 324 again. If the compute thread is sleeping, the process 300 includes "wake compute thread" 326. Either way, the process 300 then continues with retrieve data associated with a read request 328 from a queue assigned to the compute thread. It will be understood that even if there is more than one queue, the compute thread need not concern itself with the queue ID tag since a control unit or program counter will keep track of which tasks the compute thread is performing on which data once the data is saved to a queue. By one form, the ID tag is normally a sideband signal that is sent to a memory controller with the request and returned from the memory controller with the data. When it has been used to direct the data to the correct Q, the ID tag can be discarded. Retrieving the data may include placing the data at one or more input registers of the ALU and assigned to the compute thread. Once the data is retrieved by a compute thread, the process 300 includes processing the data 330, and includes processing by an ALU, FPU, or other processor logic unit for example. The process 300 then returns to determine if more data is in the queue. If the queue is deep enough, the compute thread may only need to wait for the initial load latency after which there will always be data ready for the compute thread at least as long as a program is running.

Referring to FIGS. 4-6, in addition to the example that uses two threads, one to load and one to compute, sometimes multiple buffers must be read or one address is dependent on data loaded from another. Such an example occurs with linked lists. Linked lists are difficult to handle efficiently because the next item to be processed cannot be fetched until the current data has been loaded. A load thread simplifies loading an address pointer to the next list entry while processing the current entry, but cannot hide the latency if the compute phase is too small.

In other words, assuming only two threads are maintained in this case, one to handle both loads and another to do the compute, no or little benefit exists to threading in this case since the load thread, and in turn the compute thread, must wait for data to be loaded to obtain the second address of the final data needed for processing. Of course, a more complex compute that takes a relatively longer computation could fill in some of the latency dead time.

One solution is to add a second queue. The load thread (or the address generator thread) may be initialized with the address of the first entry in a list. The load thread issues a load of the data to be summed (or to be processed), directing it to the second queue (queue 1) accessible to the compute thread. It also loads the pointer to the next entry in the list, and directs that pointer to the first queue (queue 0) to determine the address for the next data to be requested. The load thread now sleeps on queue 0 (when it is empty), waking when the pointer gets to the next entry and can repeat the process. In a steady state, this may cause two idle clocks out of five by one example so that the load thread is waiting for the new memory address. So configured, the system may lose 40% efficiency to latency.

Referring to FIG. 5, to resolve this further latency issue, the data structures may be redesigned to use a table of pointers to improve the performance and an additional load thread for the additional address-calculating operation. Thus, a table 500 of pointers (0 to 4) that indicate memory addresses to obtain data may be scheduled as entries 0 to 4 as shown and the order the data is needed to calculate further memory addresses and to maintain the compute thread as busy as possible. Reformulating the linked list as a table of pointers gives almost as much flexibility as a traditional list, but the maximum number of entries must be known when the table is allocated. This occurs when the table is allocated at the start of a task or routine but the entries are written when the program must link in another entry. So, this process is just as flexible as a linked list except the maximum size of the table is set at the beginning. If this limitation is acceptable, two load threads working in series will hide the latency and through-put will become limited by bandwidth or compute.

An example indirect lookup for a system or accelerator 400 using a table of pointers and two load threads and two queues may have an initial load thread 402, an address generator thread 404, and a compute thread 406 that communicates with a number of queues, and here including a first queue (Q0) 408 and a second queue (Q1) 410 in a local memory 412. Referring to FIG. 6, a process 600 for operating system 400 may include (1) "transmit a first read request and load first data onto a first queue" 602 by the initial load thread 402, (2) "obtain data from a next pointer on a pointer table and computed using the first data" 604 and by the address generator load thread 404, and (3) "process the second data" 606 by the compute thread 406, and by retrieving the second data from the second queue. The compute thread then may place the second data at one or more input registers of an ALU for processing.

Because the address of the pointer to the next entry is predictable, the load thread can issue load requests without reference to the data returned. The address generator thread 404 receives the pointers to the list entries and loads the data into the second queue (Q1) 410 for processing. The timing is much improved, over using a single load thread, such that no steady state idle time exists (but note that the queues should be deep enough to cover latency).

This configuration is not always limited to three threads, but in one example may be at least three threads, and in other examples is four threads and even up to eight threads where all of the threads are load threads or address generator threads except for one compute thread, forming a chain of address generator threads where after the first load thread returns data, the next load threads obtain data according to a table of pointers by one example, and where the data was used previously to determine a pointer location for the next data. The data may also be provided to the last queue for access by the compute thread. Here, the load threads still, by one example, only perform tasks related to obtaining data from memory rather than actually processing the data for another reason.

Referring to FIG. 7, by other examples, an accelerator 700 may have multiple compute threads. Thus, for accelerator 700, it may have a load thread 702, an initial compute thread 704 and a final compute thread 706. The threads 702-706 may communicate with a local memory or data store 710 such as a local RAM or on-chip RAM by one example. Some address patterns are so simple that they are better performed by fixed function hardware 708 such as a dedicated direct memory access (DMA) controller that communicates with the local memory 710 as well. For this purpose, the local memory 710 may have a first queue (Q0) 712 that receives returned data requested by the load thread 702. The data is then provided to the initial compute thread 704 to perform some calculations. The results are stored in the second queue 714, which is then used by the fixed function hardware 708 to perform calculations. These further results are then stored in the third queue 716, which is accessible to the compute thread 706. As mentioned above, the compute thread 706 may also act as a store thread, or a separate store thread may be provided. This architecture permits the ALU to spend all or more of its time on compute. One of the strengths of this architecture is that it integrates easily with FIFO-based fixed function hardware. If a DMA controller is available that can generate the required access patterns, the DMA controller can be used to read from memory and write to the compute thread's input queue. Similarly, if a hardware block is available to perform some function such as filtering, the hardware block can be accessed via queues, and its processing latency may be hidden. The software model used to implement this accelerator can integrate with fixed function blocks by treating them as another thread attached to the input and output queues allowing key parts of algorithms to be hardened without reworking all of the code. Here, hardening refers to a function that may be executed on a programmable processor but is now implemented as a hardware fixed function block. For example, a 3×3 convolution could be performed by fixed function hardware if higher performance is desired to justify the hardware cost. Thus, the load thread fetches the data, perhaps a processing thread takes the data and formats it, then writes it to another queue read by the hardware convolver. The hardware convolver writes its results to another queue that's read by another thread that writes the results back to memory.

Figure 8:
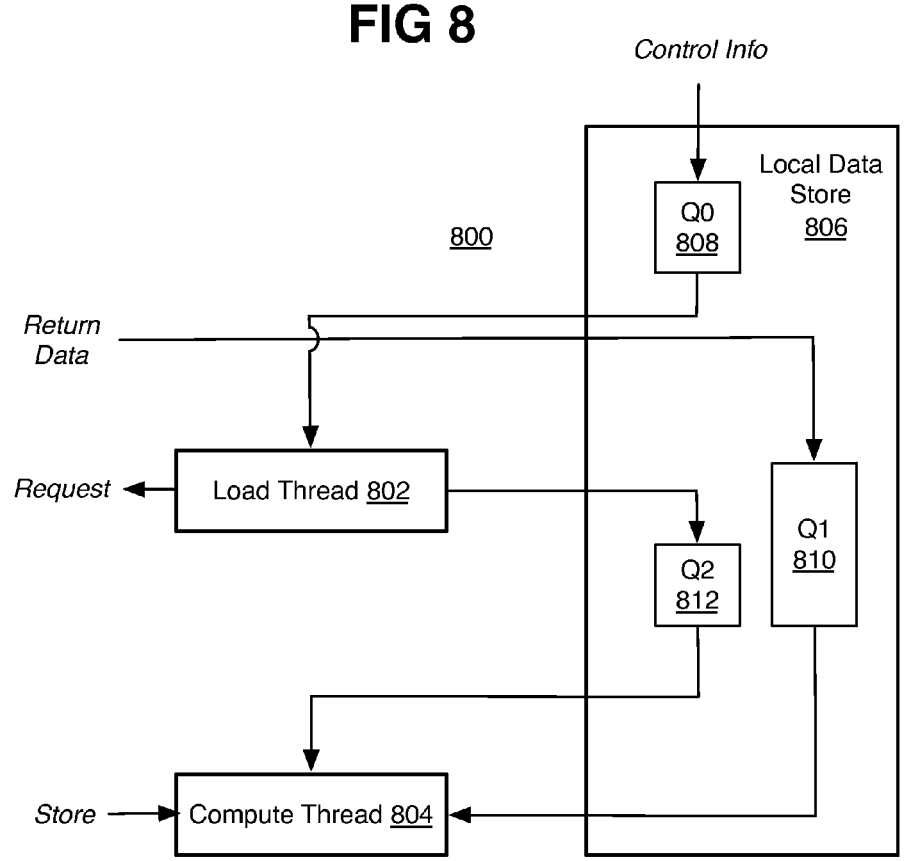
FIG. 8 is an illustrative diagram of another image processing accelerator.

Referring to FIG. 8, in another example alternative to the processing accelerator 100, a system or processing accelerator 800 may have one or more control queues in addition to the data queue. More specifically, processing accelerator 800 may have at least one load thread 802 as well as at least one compute thread 804 as described above, and communicating with a local-memory 806, such as a local data store or local RAM, and so forth, that has a queue (Q1) 810 that receives data returned from read requests issued by the load thread 802 and used for computations by the compute thread 804. In this case, however, the same or a different local memory (here it is shown at the same local memory 806) may also have at least one, and here two queues, including a first control queue (Q0) 808 and a second control queue (Q2) 812.

The control queue sends control information or instructions such as parameters from a CPU, other GPU, or other cores on the same GPU, and to the load thread 802 by having the load thread 802 read the instructions from the first queue 808. The second control queue 812 may pass some of the parameters from the load thread 802 to the compute thread 804. These parameters may include the dimensions of the image being processed or convolution kernel to apply.

It will be understood that the threads discussed here are micro-architecture-based threads each to provide a function, at least partially in parallel or asynchronously such that after the first load, the load thread does not necessarily wait for the compute thread to complete its task before loading more data in the queue. This is performed by operation of a processing accelerator or a processor at least including the delivery of data to certain assigned input registers of a processor logic unit such as an ALU by one example. The processor accelerator time-slices the computation time of the ALU among the threads in a round-robin manner to attempt to permit all threads to progress evenly. For example, while a load thread is executing in the ALU, hardware is not available for the compute phase so this may be factored into performance expectations. Thus, in some forms, the time-slicing of the ALU's usage proceeds in a manner that minimizes the time the accelerator is likely to stall. To operate the process accelerator, a thread may be formed by a combination of hardware and software as described below.

Referring to FIG. 9, both threads may run on at least some of the same hardware (meaning at least the same ALU, and in some cases the same registers) and, as mentioned, are time-sliced such that the ALU splits its time between the load and compute thread tasks. This time-slicing is similar to that used by GPU multi-threading but far fewer threads are needed so the hardware cost is much lower. The cost includes an instruction pointer and state per thread as described below, and a large enough block of local RAM to hold the queues. When this structure is an enhancement to a dedicated DMA model as mentioned above, the RAM would already be included in the budget.

More specifically, in one form, a processing accelerator 900, such as an image processing accelerator or processor, is provided to implement the data locating, retrieving, and processing performed herein. The processing accelerator 900 may be, or may be a portion of, a circuit board, a motherboard, an expansion card or graphics card, a microchip having one or more processors with one or more processor cores at each processor. Such a processor may be a CPU operating a GPU, or may simply be considered the GPU itself. By other examples, many of the components of such an accelerator 900 are not shown where not relevant to the understanding of the accelerator. By one possible example, such an accelerator 900 may be, or may have, a modified Intel® Haswell CPU. Otherwise, the accelerator 900 may be used for multi-media formats such as graphics, video, audio and/or general signal processing.

The image processing accelerator 900 may have at least one processor logic unit such as an arithmetic logic unit (ALU) 902 that, by one example, is effectively a Turing machine that performs calculations on an input and provides results at an output. The ALU 902 may have input registers 904 and including at least two registers 906, and output registers 908 for receiving the results from the ALU. By one example, the ALU 902 is a 16-bit ALU with at least 32 registers where the registers can be optionally divided into two groups of 16 or four groups of 8 for use by two or four threads respectively.

As mentioned, the calculations performed by the two Q threads are roughly the same as would be performed by one GPU multi-thread. Now, however, while at least some address calculations are always needed, the address calculations are asynchronous to the rest of the computation. So in principle, the number of local registers does not need to increase. In practice, however, there is likely to be some duplication of state between threads, such as loop counters, so a small increase in registers will help relieve pressure. In other words, where each thread may need a count of which pixel the thread is processing, for a single threaded implementation there would be only one count. For two threads, however, each thread may need its own counter since each thread will be working on a different pixel so that the count will be different for each.

It is useful to think of Q threads as micro-threads that run within a normal thread. The ALU does not suffer a full context switch and instead just changes the program counter and some thread state. The main register file 904 is shared by all Q threads although each Q thread may be assigned different registers 906 within the file 904. A compiler 910 may optimize register usage across all threads. By one form, the compiler 910 may be in the form of software stored at a main or other memory. Alternatively, registers 906 may be statically divided between them. For one example, the Intel® Haswell CPU has up to eight cores with 168 integer registers per core. In this example case, each core or ALU may have as many as 21 threads with eight registers or more, and in one form, three threads with 51 registers. By one approach, if each thread has an offset that can be added to each register index to move it into a unique range, the same code can be executed in different thread. For example, if thread A calls a function that uses register 0, then thread B can't call the same function because it is not allowed to use register zero. If, however, each thread has an offset that is added to the register number (e.g. 0 for thread A and 16 for thread B), when thread A calls the function, it uses register 0 but when thread B calls the same function, it uses register 16. Hence, the same code can be executed by each thread without them interfering with each other.

By other approaches, it would be possible to combine GPU multi-threads and the load/compute Q threads to share the same ALU or share the same processor with multiple cores or ALUs. By one approach, where the basic model is pairs of load/compute Q threads as described herein, there may be additional load threads and/or additional compute threads available so that when either the load or compute thread stalls, operation may continue with a different load or compute thread. This may need further hardware to support each thread running a different program and scheduling based on queue state. Alternatively, if the basic model is GPU multi-threading, in this case, some additional hardware beyond that merely needed for more threads would be required to support spawning multiple copies of the same load/compute thread pairs. Hardware such as a thread manager described below would be needed to run such a system. Also, it would be possible to support different combinations of multi-threading ALUs and Q thread ALUs on the same processor, chip, and/or accelerator with multiple ALUs, although such configurations would need additional manager and scheduler programming to coordinate the efforts of the ALUs The accelerator 900 also may have thread state registers 912 that indicate the state of at least one, but here each, thread. Each state register may hold the status of each thread including whether the thread is running or suspended, and if the thread is suspended, what is it waiting for, and specifically for example, whether the thread is waiting for a queue to indicate "not empty" or to indicate "not full".

The accelerator 900 also may have a local memory (or local data store) 914 with queues 916. Although queues may be implemented entirely in hardware using memory dedicated to each queue, imaging accelerator 900 may have local RAM to hold intermediate results as well as queues 916, allowing individual depths to be tuned. The queue 916 may operate by first-in, first-out (FIFO) although other alternatives are contemplated as long as it is determined whether the queue is empty or full in a logical, efficient, and low cost manner. Per-queue read and write pointers 918 may be implemented in hardware, and may be used by a hardware thread scheduler (or thread scheduling unit) 922. The pointers are counters to indicate which entry in the FIFO queue should be read and/or written to next. When the FIFO queue is written to, the write pointer advances, and wraps when it gets to the maximum value. When the FIFO queue is read, the read pointer advances, and wraps when it gets to the end of the queue. The FIFO is empty when the read write pointers are equal, and full when the write pointer is one behind the read pointer.

To control the threads and the memory, the accelerator 900 may have a thread manager 920 that may include the thread scheduler 922 and a queue manager 924. The thread manager 920 may receive instructions to obtain data and perform computations from programs in a program store 926 and that are decoded by a decoder 928. The queue manager 924 controls data transfer and traffic between the local-memory 914 and the input register 904 of the ALU 902. By one example, the thread manager 920 selects the thread to run based on status flags from the queues, and other alternatives for monitoring the queue mentioned above. It selects the thread state to use including an instruction pointer, stack pointer, and any condition flags to indicate the thread state at the thread state register 912. The thread manager 920 holds the read and write pointers 918, which may be part of the thread scheduler 922, for each queue, and that can signal queue status back to the thread manager 920. The queue manager 924 also may control access to the local memory 914.

In one example, memory loads may be non-blocking. In other words, the ALU continues to execute instructions after issuing a load, and only stalls if data from the load has not reached the receiving queue before it is needed. When a thread attempts to write to a full queue or read from an empty queue, it is suspended and will not be executed until the queue changes state as described above. Suspending the thread at the top of the pipeline immediately after the instruction has been decoded avoids recalling issued instructions. As mentioned, thread arbitration is round-robin to ensure all threads progress evenly.

If this structure is implemented purely in software, a separate thread scheduler would be needed to determine what thread should run when. This adds cost in the form of time making this process more inefficient, and forces the load and processing threads to run in coarser time slices (requiring deeper queues to cover the increased latency which increases the hardware cost). Instead, the thread scheduler may be implemented in hardware such as a finite state machine. Adding hardware support for thread switching based on cycle-by-cycle queue status, and by one example, allows cycle-by-cycle evaluation of the best thread to run and minimizes overheads. The timing may be implemented in different durations for monitoring the status of the queue, such as every other cycle or longer durations, although this may cause more latency.

When more than one thread reads from the same queue, wrapping queue accesses in acquire and release steps performed by one of the threads (for example, where one of the threads acquires the queue, reads and writes to the queue as many times as necessary including for multiple entries in the queue, and then releases the queue for use by other threads), attempts to ensure atomicity across multiple accesses is necessary by controlling the acquire/release operations. However, if each entry in the queue is independent (where each item can be read in a single operation such that each item is assigned to a single entry in the queue), then such atomicity control over the acquire/release operation may not be needed. This lowers the risk that one function/thread will obtain an old version of data that is being worked upon by another thread.

Referring to FIG. 9A, by another optional example, an accelerator 950, may have similar components as accelerator 902, except here accelerator 950 may have a number of ALUs 930 and 932, and in this example, the two or more ALUs 930 and 932 may share a global data store 934 with one or more Q thread queues 936 while the ALUs 930 and 932 each have their own local data store 938 and 940 with Q thread queues 942 and 944 respectively. In this case, the data store used for global queues may not be the one used for local queues to help scale bandwidth with the number of processors. For example, queues that transfer data between threads on different ALUs may be placed in the global memory while queues that transfer data between threads on the same ALU may be placed in local memory. It will be understood that the queue model scales well across multiple-instructions, multiple-data (MIMD) systems.

As to the software side, the hardware is a good fit for OpenGL (open graphics library) and OpenCL (open computing language) samplers. One simple way to program this architecture described herein is to make the threads explicit. Thinking in terms of loading data into the ALU, processing it, and storing the results to memory naturally breaks a problem into phases that will map to threads. For example, it is possible for a compiler to allocate code to different threads, and this may be necessary if OpenCL or OpenGL is used. Also, the inner loop of an algorithm will typically calculate addresses, load data, process it and write it back. In this case, the division between threads is easy: everything up to and including the load is in one thread, and everything else is in the other thread. If the results of calculations performed in the first thread are needed in the second, the results can be passed through another queue.

There are certain types of algorithm that map poorly onto this architecture, particularly anything that uses the results of the second thread in the first thread. In most cases, this situation can be handled by another queue feeding results back from the second thread to the first and some restructuring of the code, or by adding additional load or address generator threads as already described above. Alternatively, however, it would be advantageous to use one or more of the combinations described above with the added flexibility of data-parallel GPU multi-threading instead or in addition to the Q threads.

The software model is straightforward and easily understood. Below is a sample pseudo code for a simple thread convolution (3×3 pixel block) Load( )

```
{
    // Configure queues.
    QControl(eQ0, Q0_BASE_ADDRESS, Q0_DEPTH, Q0_WIDTH,
    eCPU, eT0);
    // commands from the CPU
    QControl(eQ1, Q1_BASE_ADDRESS, Q1_DEPTH, Q1_WIDTH,
    eMem, eT1);
    // data read from memory
```

```
QControl(eQ2, Q2_BASE_ADDRESS, Q2_DEPTH, Q2_WIDTH,
eT0, eT1);
// commands for compute thread
// Launch compute thread.
TCreate(eT1, Convolution3x3Compute);
// Load src & dst buffer info from command queue.
yAddress = QRead(eQ0);
dstAddress = QRead(eQ0);
width = QRead(eQ0);
height = QRead(eQ0);
// Forward dst buffer info to compute thread.
QWrite(eQ2, dstAddress);
QWrite(eQ2, width);
QWrite(eQ2, height);
// Forward 9 weights to compute thread.
QWrite(eQ2, QRead(eQ0));
QWrite(eQ2, QRead(eQ0));
QWrite(eQ2, QRead(eQ0));
QWrite(eQ2, QRead(eQ0));
QWrite(eQ2, QRead(eQ0));
QWrite(eQ2, QRead(eQ0));
QWrite(eQ2, QRead(eQ0));
QWrite(eQ2, QRead(eQ0));
QWrite(eQ2, QRead(eQ0));
for (y = 0; y < height; y++)
{
    xAddress = yAddress;
    for (x = 0; x < width; x++)
    {
        address = xAddress;
        QLoad(eQ1, address, eMemFormatRaw8);
        QLoad(eQ1, address+1, eMemFormatRaw8);
        QLoad(eQ1, address+2, eMemFormatRaw8);
        address += stride;
        QLoad(eQ1, address, eMemFormatRaw8);
        QLoad(eQ1, address+1, eMemFormatRaw8);
        QLoad(eQ1, address+2, eMemFormatRaw8);
        address += stride;
        QLoad(eQ1, address, eMemFormatRaw8);
        QLoad(eQ1, address+1, eMemFormatRaw8);
        QLoad(eQ1, address+2, eMemFormatRaw8);
        xAddress += 1;
    }
    yAddress += stride;
}
// Wait for compute thread to finish.
TSleepOnT(eT1);
// Signal completion to CPU and terminate.
SignalCpu( );
TDestroy(eT0);
}
thread Convolution3x3Compute( )
{
    yAddress = QRead(eQ2);
    width = QRead(eQ2);
    height = QRead(eQ2);
    w0 = QRead(eQ2);
    w1 = QRead(eQ2);
    w2 = QRead(eQ2);
    w3 = QRead(eQ2);
    w4 = QRead(eQ2);
    w5 = QRead(eQ2);
    w6 = QRead(eQ2);
    w7 = QRead(eQ2);
    w8 = QRead(eQ2);
    for (y = 0; y < height; y++)
    {
        xAddress = yAddress;
        for (x = 0; x < width; x++)
        {
            s = QRead(qQ1);
            d = s * w0;
            s = QRead(qQ1);
            d += s * w1;
            s = QRead(qQ1);
            d += s * w2;
            s = QRead(qQ1);
            d += s * w3;
            s = QRead(qQ1);
            d += s * w4;
            s = QRead(qQ1);
            d += s * w5;
            s = QRead(qQ1);
            d += s * w6;
            s = QRead(qQ1);
            d += s * w7;
            s = QRead(qQ1);
            d += s * w8;
            QStore(d, xAddress, eMemFormatRaw8);
            xAddress += 1;
        }
        yAddress += stride;
    }
    // Wait for writes to memory to complete and exit.
    TSleepOnStore( );
    TDestroy(eT1);
}
```

The next example pseudo code reads planar YUV data (each component is held in separate buffer) with U and V subsampled. Each component is loaded into its own queue. It would be possible to load all components to the same queue, but handling them separately leads to better performance because each queue can be unordered with respect to each other, meaning that a load for one queue can overtake a load for another if the hardware supports it. Reordering allows local optimizations at caches or the memory controller to improve efficiency.

The example also shows 8 bit data being loaded as 32 bits, and the bytes extracted one by one instead of relying on external hardware such as caches to combine adjacent requests.

```
thread PlanarYuvLoad( )
{
    // Configure queues.
    QControl(eQ0, Q0_BASE_ADDRESS, Q0_DEPTH, Q0_WIDTH,
    eT0, eMem);
    // Y data from memory
    QControl(eQ1, Q1_BASE_ADDRESS, Q1_DEPTH, Q1_WIDTH,
    eT0, eMem);
    // U data from memory
    QControl(eQ2, Q2_BASE_ADDRESS, Q2_DEPTH, Q2_WIDTH,
    eT0, eMem);
    // V data from memory
    TCreate(eT1, YuvCompute); // launch compute thread
    for (y = 0; y < height; y++)
    {
        xAddress = yAddress;
        for (x = 0; x < width; x += 4)
        {
            QLoad(eQ0, xAddress + YBaseAddress,
            eMemFormatRaw32);
            if ((x & 0x1) == 0)   // load U & V at half rate
            {
                QLoad(eQ1, xAddress + UBaseAddress,
                eMemFormatRaw32);
                QLoad(eQ2, xAddress + VBaseAddress,
                eMemFormatRaw32);
            }
            xAddress += 1;
        }
        yAddress += stride;
    }
    TSleepOnT(eT1); // wait for compute thread to finish
    // Signal completion to CPU and terminate.
    SignalCpu( );
    TDestroy(eT0);
}
thread YuvCompute( )
{
    for (y = 0; y < height; y++)
    {
```

```
        for (x = 0; x < width; x++)
        {
            yData = QRead(eQ0, 0);
            uData = QRead(eQ1, 0);
            vData = QRead(eQ2, 0);
            Compute((yData >> 0)&0xFF, (uData >> 0)&0xFF,
            (yData >> 0)&0xFF;
            Compute((yData >> 8)&0xFF, (uData >> 0)&0xFF,
            (yData >> 0)&0xFF;
            Compute((yData >> 16)&0xFF, (uData >> 8)&0xFF,
            (yData >> 8)&0xFF;
            Compute((yData >> 24)&0xFF, (uData >> 8)&0xFF,
            (yData >> 8)&0xFF;
            yData = QRead(eQ0, 0);
            Compute((yData>>0)&0xFF, (uData >> 16)&0xFF,
            (yData >> 16)&0xFF;
            Compute((yData>>8)&0xFF, (uData >> 16)&0xFF,
            (yData >> 16)&0xFF;
            Compute((yData>>16)&0xFF, (uData>>24)&0xFF,
            (yData >> 24)&0xFF;
            Compute((yData>>24)&0xFF, (uData>>24)&0xFF,
            (yData >> 24)&0xFF;
        }
    }
    TDestroy(eT1);
}
```

A thread is created by assigning the thread a set of state registers that include an instruction pointer. When a thread is enabled, the thread is executed round-robin cycle-by-cycle with all other enabled threads, which may have the side-effect of hiding any register-to-register stalls a thread might normally see.

A thread attaches itself to queues that it will read or write. As described above, the thread will stall if it attempts to read an empty queue or write to a full one. The thread will wake when the queue the thread is stalled on becomes available. Each queue has a specified producer and consumer, which allows the hardware to wake the correct thread without continually re-executing the blocking instruction.

The following commands are used to control threads:

TABLE 1

Thread Control Commands

| Command | Description |
|---|---|
| TCreate(tid, address) | Sets the initial value of a thread program counter, initializes its state, and enables it. |
| TDestroy(tid) | Stops execution of the specified thread. |
| TSync( ) | Sets the calling thread's sync flag, puts thread to sleep until flag is cleared. |
| TSleepOnSync(tid) | The calling thread sleeps until the specified thread's sync flag is set, clears the flag before waking. |
| TSleepOnT(tid) | The calling thread sleeps until the specified thread is destroyed. |
| TSleepOnQ(qid) | The calling thread sleeps until there is some activity on the specified queue (read or write). |
| TSleepOnStore( ) | The calling thread sleeps until all issued stores to memory have completed. |

To access the queues, the queues are a global resource shared by all threads on an ALU and are held in local RAM as described above. As each thread is multiplexed on the same hardware, an ALU can only read or write one queue in a given clock, although the RAM may benefit from being multi-ported to allow simultaneous accesses to and from memory while the ALU is also active.

There are typically more queues than threads because a thread may take several inputs, or there may be control and data passed between threads. A good rule of thumb is to have twice the number of queues as there are threads. Queues are not pre-allocated to threads, but are dynamically allocated when they are created. The producer and consumer threads (write and read) are defined to let the hardware wake or suspend the correct thread. Queue allocation also specifies the base address in local RAM, its depth and its width.

The programmer may see queues at the natural word width of the ALU (32 bits by one example). Reading a queue returns a word, but the queue does not have to use that much memory if it is not required. Queue control registers at a queue manager 924 (or otherwise at the thread manager) for example, specify the width of the queue, and if the width is eight bits, only one byte per entry is allocated, but a read pads the data from 8 to 32 bits. Similarly, a write to the queue would use the lower eight bits from the word.

If the queue needs to be wider than the ALU width, the access functions can take an offset parameter to specify which word should be accessed. The Peek and Poke functions allow several accesses to one queue entry before it is advanced. Wide FIFOs are most commonly used for memory accesses (discussed more below).

The following commands are used to control and access the queues.

TABLE 2

Queue Control and Access Commands

| Command | Description |
|---|---|
| QControl(qid, address, depth, width, producer, consumer) | Configures the specified queue, giving its base address in platform-specific units, depth in words and the width of the word in bits. |
| QRead(qid, offset) | Reads one word from the queue specified in the qid field and advances the read pointer. The offset field indicates the word to read in a queue wider than the ALU width. Blocks if queue is empty. |
| QPeek(qid, offset) | Same as QRead but does not advance queue. |
| QWrite(qid, offset) | Writes one word to the queue specified in the qid field and advances the write pointer. The offset field indicates the word to write in a queue wider than the ALU width Blocks if queue is full. |
| QPoke(qid, offset) | Same as QWrite but does not advance queue. |
| QSpace(qid) | Returns the number of empty slots in the specified queue. |
| QItems(qid) | Returns the number of used slots in the specified queue. |
| QLoad(qid, address, format) | Read from memory address and load data into specified queue. See below for format field. Does not block if queue is full but does set error flag, space must be checked. |
| QStore(qid, address, format) | Write data from specified queue to address in memory. See below for format field. Does not block if queue is empty but sets error flag. |

As the command table shows, memory accesses may be performed through queues (as well as other methods supported by the instruction set). The format field indicates how much data should be moved, and the address is in units of the format. Giving the access functions a format allows hardware to convert different buffer types to a common internal format so that it allows code to be reused. However, this type of bit swapping is expensive to do in software but cheap in hardware. Typical memory access formats would include raw 8, 16, 24 and 32 bit words, various RGBA and YUV formats, and tiled data.

The design discussed uses queues to communicate between threads sharing the same ALU. Queues can also link separate ALUs and allow true parallel execution. The addition of a couple of extra functions also allows multiple ALUs to share the same queues for situations where results need to be collated or distributed.

TABLE 3

Queue Sharing Commands

| Command | Description |
| --- | --- |
| QAcquire(qid) | Lock the specified queue to the calling thread, blocks if queue has already been acquired. |
| QRelease(qid) | Release a previously acquired queue. |

Referring now to FIG. 10, system 1100 may be used for an example data processing process 1000 shown in operation, and arranged in accordance with at least some implementations of the present disclosure. In general, process 1000 shows a method of processing acceleration. In the illustrated implementation, process 1000 may include one or more operations, functions, or actions as illustrated by one or more of actions 1002 to 1024 numbered evenly, and used alternatively or in any combination. By way of non-limiting example, process 1000 will be described herein with reference to operations discussed with respect to any of FIGS. 1-9 above and operated by example processing accelerator system 1100 discussed below.

In the illustrated implementation, system 1100 may include a processing accelerator 1156, similar to processing accelerator 100 that that may operate a load thread 102 and a compute thread 104 as described with processing accelerator 100, but that also may be similar to the threads described in any of the implementations described herein. Although process 1000, as shown in FIG. 10, may include one particular set of operations or actions associated with particular processing accelerators or processors, these operations or actions may be associated with different processing accelerators, image processing accelerators, processors, and so forth, than that illustrated here. Although process 1000, as illustrated, is directed to the operation of both the load and compute thread, the concepts and/or operations described may be from the perspective of only one of the thread types instead.

Process 1000 may include "receive instructions to retrieve data" 1002, where, by one of many examples, a load thread of a processing accelerator may receive instructions to retrieve a block of pixel data for use in computations to ultimately display the frame in a video sequence. Many other tasks are contemplated whether or not related to graphics display. Such instructions may come from a thread manager, and more specifically, by directing an instruction pointer along tasks needed to be performed for a program by one example.

Process 1000 may include "use processor logic unit to calculate memory address" 1004. This may include providing the processor logic unit, such as the ALU, with in initial data to calculate a memory address for the load thread.

Process 1000 may include "prepare and transmit read request with queue ID" 1006. As mentioned above, once the memory address is known, the load thread may form a read request and place a queue ID on the read request so the load thread knows where to put the data upon its return from a non-local memory.

Process 1000 may include "place returned data in queue in local memory" 1008, and specifically in the queue that matches the ID accompanying the data.

Process 1000 may include "determine status of queue" 1010 which may include continuously monitoring the queue in a clock-by-clock basis by one example, where a flag may be sent to a thread manager indicating whether or not the queue is full. If the queue is not full, the process loops back to the start to retrieve more instructions to retrieve the next portion of data.

If the queue is full, process 1000 may include "suspend until queue is not full" 1012, in which case the operation of the load thread is suspended. The monitoring of the queue continues, and when the queue is no longer empty, the process 1000 continues with "awaken the load thread" 1014 before starting the process again.

For operation of the compute thread, the process 1000 continues with "determine status of the queue" 1016. If the queue is empty, the process 1000 includes "sleep if queue is empty" 1018, for which the compute thread is put in a sleep mode such that it does not operate. Once it is determined that the queue is not empty, the process 1000 continues with "awaken the compute thread" 1020.

Whether or not the compute thread is awakened, the process 1000 continues with "retrieve data from queue in local memory" 1022. The process 1000 may then include "provide data to processor logic unit for computations" 1024. The results of the computations may then be used for further computations or for other uses, such as to display an image.

The process 1000 may then loop back to the start where it is determined whether or not the queue is empty, and the compute process retrieves the next data entry in the queue if present. Again, the status of the queue may be indicated by flags sent to a thread manager for example.

In general, process 1000 may be repeated any number of times either in serial or in parallel, as needed. Furthermore, in general, the load and compute threads may be implemented as combinations of hardware, software, firmware, or other combinations which may or may not be similar to those combinations described herein. As will be understood, the threads are an instruction level (or thread level) concept that is operated by software and/or hardware. Thus, the processing accelerators 100, 400, 700, and 800 show the instruction level of the processing accelerators, while processing accelerator 900 and system 1100 mainly show the hardware and software level components that may operate the other instruction-level processing accelerators described herein.

While implementation of example process 200, 300, 600, or 1000 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the accelerators discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

Figure 11:
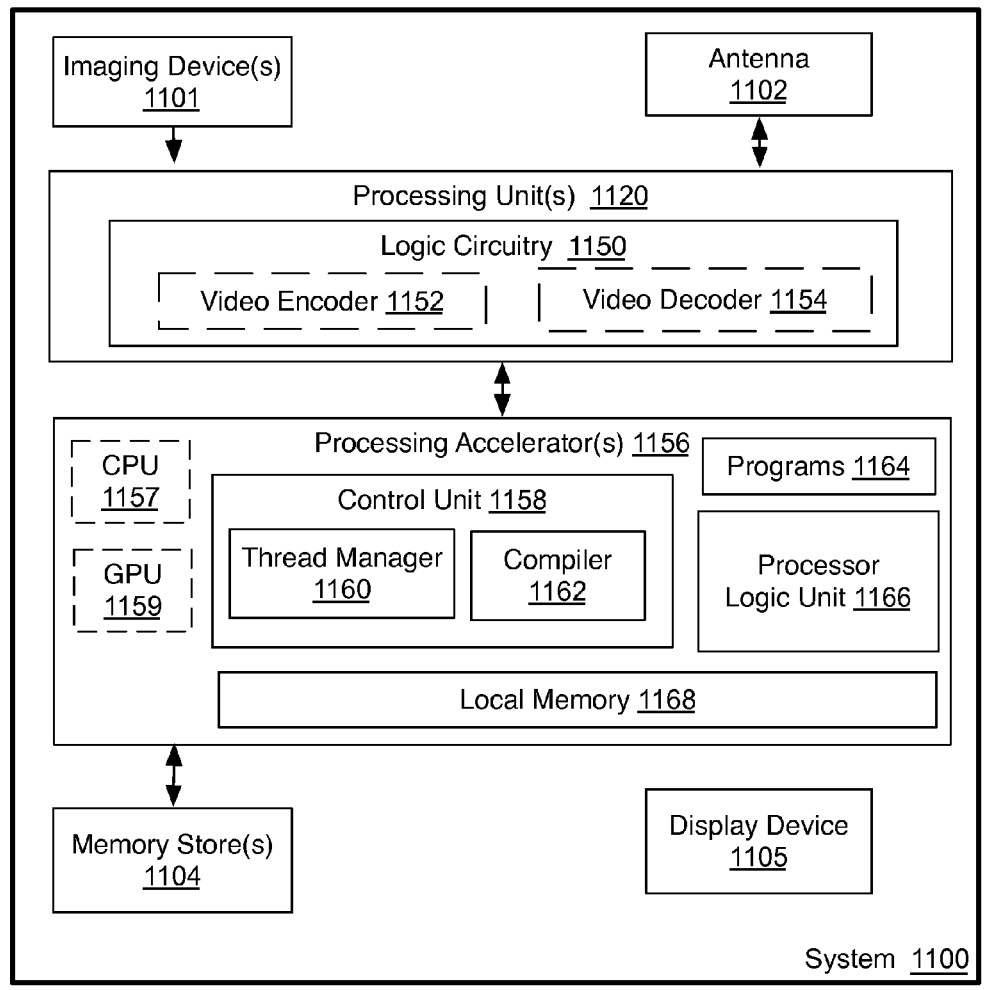
FIG. 11 is an illustrative diagram of an example system.

Referring to FIG. 11, an example system 1100 using one or more processing accelerator 1156 may be arranged in accordance with at least some implementations of the present disclosure. In the illustrated implementation, the processing accelerator(s) 1156 may be, or have, one or more central processing units (CPUs) 1157 or graphic processing units (GPUs) 1159 or any combination of both, or it may be a circuit board or card with one or more CPUs or GPUs or a combination of both.

The processing accelerator 1156 may have a control unit 1158 with a thread manager 1160 and a compiler 1162. The processing accelerator 1156 may also have one or more program stores for storing programs or instructions for example. The processing accelerator 1156 may also have at least one processor logic unit 1166, such as one or more ALU or FPU with data registers and thread state registers, as well as a local memory 1168, including local RAM by one example. These components provide for many of the functions described above to operate a load thread and a compute thread.

The system 1100 may also have a processing unit 1120 that communicates with an imaging device 1101, such as a camera for example, and an antenna 1102 to receive or transmit data wirelessly. Processing accelerators 1156, a memory store 1104 which may include main memory, internal, external, and/or shared cache, and so forth, and/or a display device 1105 to display output image data may be capable of communication with one another, via, for example, a bus, wires, or other access. In various implementations, display device 1105 may be integrated in system 1100 or implemented separately from system 1100. The processing unit 1120 may have logic circuitry 1150 that, for a video display system, may include a video encoder 1152 and/or a video decoder 1154 for processing of image data and by use of the processing accelerator 1156.

As will be appreciated, the components illustrated in FIG. 11 may include a variety of software and/or hardware modules and/or modules that may be implemented via software or hardware or combinations thereof. For example, the modules may be implemented as software via processing accelerator 1156 by using central processing units 1157 and/or graphics processing units 1159, or the modules may be implemented via a dedicated hardware portion or portions of graphics processing units. Furthermore, both the local memory 1168 and the shown memory stores 1104 may be shared memory for the components of the processing accelerator 1156, for example. Also, system 1100 may be implemented in a variety of ways. For example, system 1100 (excluding display device 1105) may be implemented as a single chip or device having a graphics processor, a quad-core central processing unit, a memory controller input/output (I/O) module. In other examples, system 1100 (again excluding display device 1105) may be implemented as a chipset.

When the processing accelerator 1156 uses central processing units 1157, the CPUs may include any suitable implementation including, for example, microprocessor(s), multicore processors, application specific integrated circuits, chip(s), chipsets, or the like. Furthermore, when the processing accelerator uses graphics processing units 1159, the GPUs may include any suitable implementation including, for example, processor(s), multicore processors, application specific integrated circuits, programmable logic devices, graphics cards, integrated graphics, general purpose graphics processing unit(s), or the like. In addition, memory stores 1104 or local memory 1168 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1104 and/or at least portions of local memory 1168 also may be implemented via cache memory. In various examples, system 1100 may be implemented as a chipset or as a system on a chip.

Figure 12:
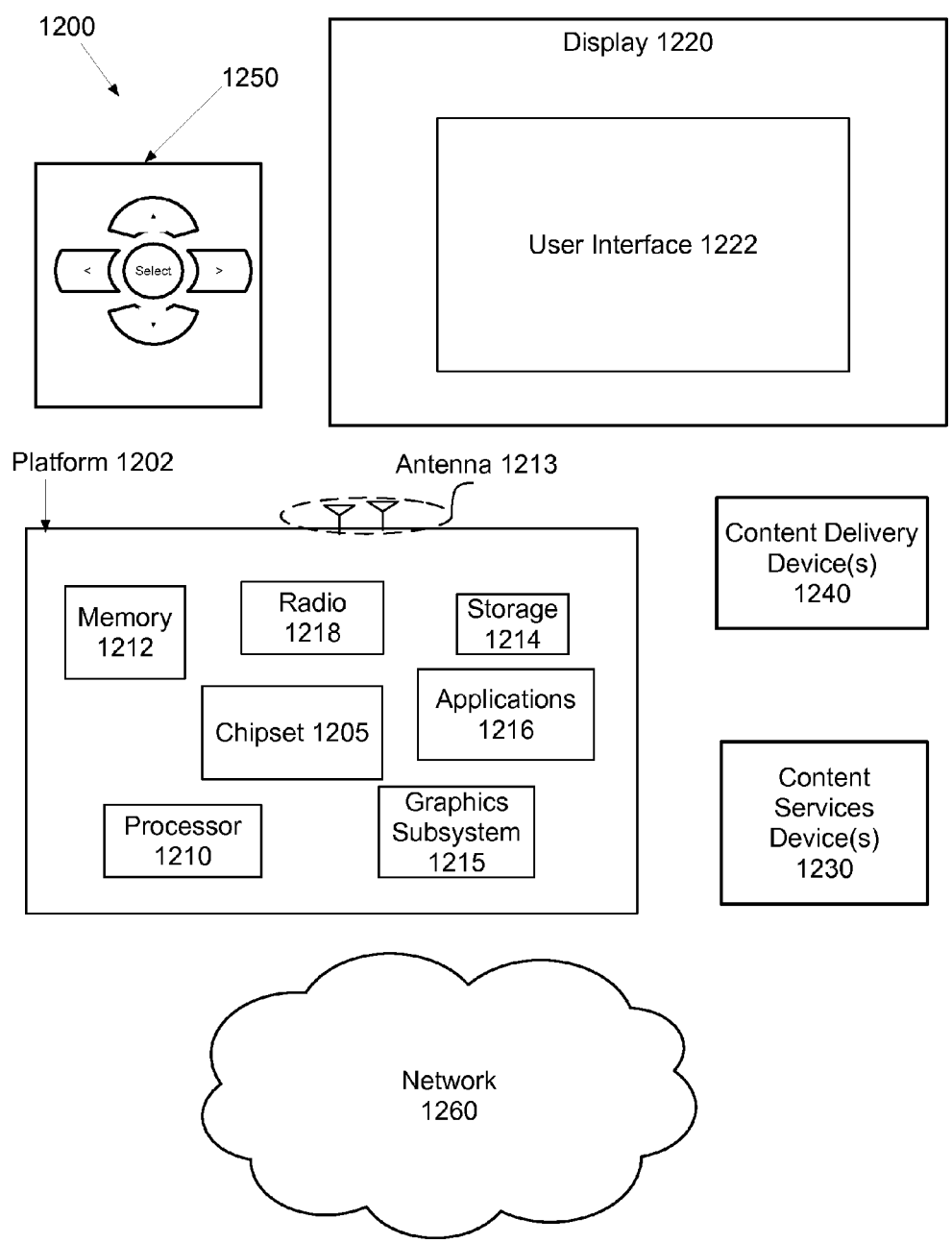
FIG. 12 is an illustrative diagram of another example system.

Referring to FIG. 12, an example system 1200 in accordance with the present disclosure and various implementations, may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internes device (MID), messaging device, data communication device, and so forth.

In various implementations, system 1200 includes a platform 1202 communicatively coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The processing accelerator and techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In implementations, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
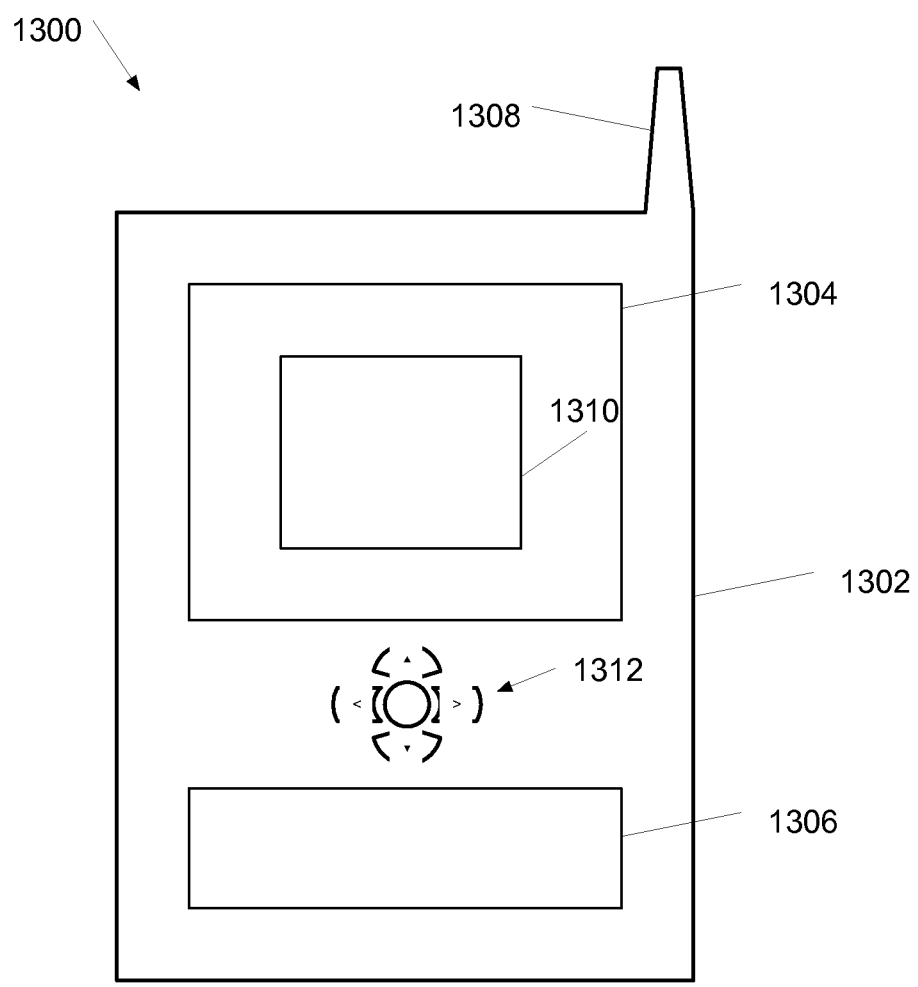
FIG. 13 illustrates another example device, all arranged in accordance with at least some implementations of the present disclosure.

As described above, system 1100 or 1200 may be implemented in varying physical styles or form factors. FIG. 13 illustrates implementations of a small form factor device 1300 in which system 1100 or 1200 may be implemented. In implementations, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internes device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 13, device 1300 may include a housing 1302, a display 1304, an input/output (I/O) device 1306, and an antenna 1308. Device 1300 also may include navigation features 1312. Display 1304 may include any suitable display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By one approach, a processing accelerator comprises at least one processor logic unit to execute a plurality of threads, and at least one queue to be written to by at least one of the threads and read by at least one of the threads. A thread scheduling unit is provided to determine which of the threads to execute depending, at least in part, on the status of at least one of the queues.

By other approaches, at least one of the threads is reserved to request data from a main memory and have the data placed in the queue, and at least one other of the threads is reserved to perform computations on the data read from the queue and requested by the one thread, where the plurality of threads comprises at least one load thread to request data from a main memory to have the data placed in the queue, and is arranged to operate depending on whether the queue is full. The plurality of threads comprises at least one compute thread to use the requested data and arranged to operate depending on whether the queue is empty. The processing accelerator also comprises a thread manager to determine a status of the queue, a queue manager to manage transfer of data in and out of the queue, and at least one thread state register to indicate the status of at least one of the threads.

By one form, the at least one queue comprises first and second queues, and the plurality of threads comprises a load thread to place first data in the first queue, and at least one of:

(A) at least a compute thread, and at least one address generator thread to use the first data to determine a memory address of second data to be placed in the second queue, wherein the compute thread retrieves the second data from the second queue for data calculations by the processor logic unit, (B) at least two compute threads comprising a first compute thread that uses data from the first queue to perform calculations by the processor logic unit with result data placed in the second queue, and the second compute thread to use the result data in the second queue in computations by the processor logic unit, and (C) the processing accelerator comprising fixed function hardware to obtain data from a memory, wherein the fixed function hardware to obtain the first data from the first queue to determine a memory address to obtain second data to be placed in the second queue.

By another approach, a processing accelerator comprises at least one processor logic unit, at least one load thread to be executed by the at least one processor logic unit and reserved to perform tasks related to locating or obtaining data or both from a memory, and at least one compute thread to be executed by the at least one processor logic unit and reserved to perform computations on the data found by the load thread.

By another aspect, the processing accelerator comprises a plurality of registers communicatively connected to the processor logic unit and provided to store data to be used for calculations by the processor logic unit, wherein a portion of the registers are assigned to one or more of the threads, wherein the compute thread is to provide the data from the queue to the registers to be used by the processor logic unit. At least one local memory has at least one queue to store the data located by the load thread, the load thread and the compute thread operating, at least in part, due to the status of the queue, wherein the load thread is to transmit read requests to have data obtained and placed in the queue. The processing accelerator comprises at least one of: (a) a single chip processor with one or more cores, having one or more of the processor logic units, the load thread, and the compute thread, and (b) a card with a digital circuit to be placed on a motherboard, the processing accelerator being mounted at a smartphone, a tablet, or a hand-held electronic device.

By yet another approach, a computer implemented method of processing acceleration comprises reserving at least one load thread to perform tasks related to locating or obtaining data or both from at least one memory, and reserving at least one compute thread to perform calculations using data associated with a load thread and performed by at least one processor logic unit.

By another aspect, the method comprises coordinating the operation of the load thread and compute thread depending, at least in part, on a status of at least one queue storing the data on a local memory, putting the compute thread to sleep when the queue is empty, suspending operation of the load thread when the queue is full, wherein the load thread and the compute thread operate asynchronously so that the load thread is provided to locate or obtain new data while the compute thread is performing at least one task with other data, loading first data into a first queue by the load thread, using the first data to obtain second data, storing the second data in a second queue, using the second data from the second queue to perform calculations by the compute thread, using at least one instruction pointer from a pointer table to obtain the second data; and at least one of: (a) using a second load thread to compute a memory address of the second data and obtain the second date, (b) using a second compute thread to calculate the second data, and (c) using fixed function hardware to obtain the second data.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A processing accelerator, comprising:
a processor logic unit that is a single arithmetic logic unit (ALU) or a single floating point unit (FPU);
at least one load thread to be executed by the processor logic unit to determine addresses of data and reserved to perform tasks related to locating or obtaining the data or both from a non-local memory without using the data for computations unrelated to an address of the data;
at least one compute thread to be executed by the same processor logic unit and reserved to perform computations on the data found by the load thread so that the load thread and compute thread alternatively share the same one processor logic unit during context switching between the load thread and compute thread;
at least one local memory having at least one queue to store the data located by the load thread, the load thread and the compute thread operating, at least in part, due to the status of the queue so that the load thread wakes or is suspended depending, at least in part, on whether the queue is full, and the compute thread wakes or is put to sleep depending, at least in part, on whether the queue is empty; and
a plurality of input registers communicatively connected to the processor logic unit and provided to store data to be used for calculations by the processor logic unit, wherein the compute thread is to transfer the data from the queue to at least one of the input registers for use by the processor logic unit.

2. The processing accelerator of claim 1 wherein the load thread is to transmit read requests to have data obtained and placed in the queue.

3. The processing accelerator of claim 1 comprising at least one of:
a single chip processor with one or more cores, having one or more of the processor logic units, the load thread, and the compute thread, and
a card with a digital circuit to be placed on a motherboard.

4. The processing accelerator of claim 1 being mounted at a smartphone, a tablet, or a hand-held electronic device.

5. The processing accelerator of claim 1 comprising:
wherein a portion of the registers are assigned to one or more of the threads,
and
at least one of:
(a) a single chip processor with one or more cores, having one or more of the processor logic units, the load thread, and the compute thread, and
(b) a card with a digital circuit to be placed on a motherboard;
the processing accelerator being mounted at a smartphone, a tablet, or a hand-held electronic device.

* * * * *